April 21, 1936.  L. A. DEAL  2,038,166
SAIL ATTACHMENT FOR BICYCLES
Filed June 13, 1935  2 Sheets-Sheet 2
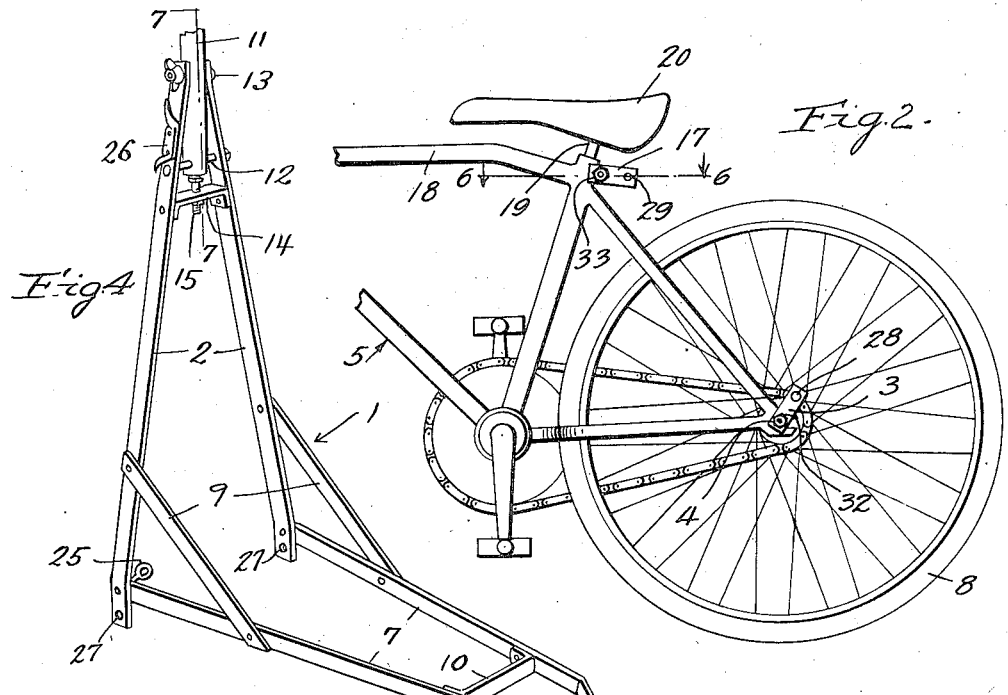
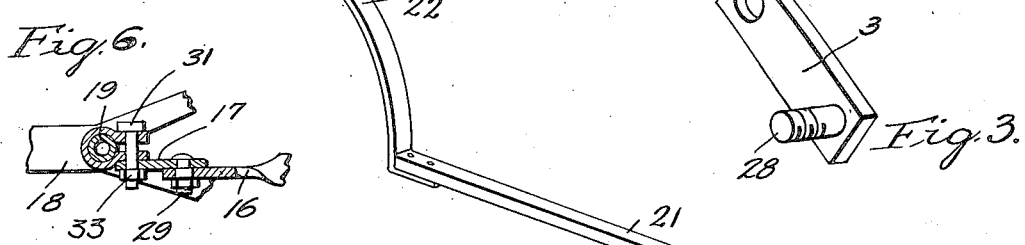
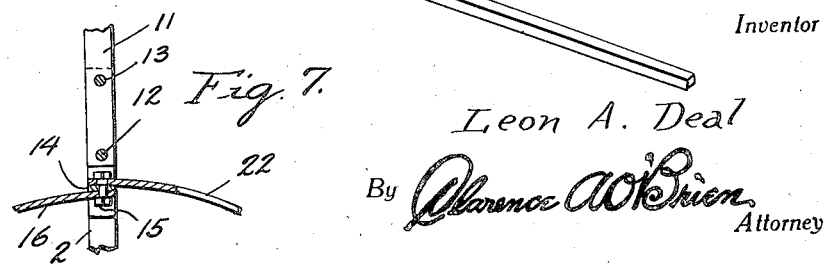
Inventor
Leon A. Deal
By Clarence A. O'Brien
Attorney Patented Apr. 21, 1936

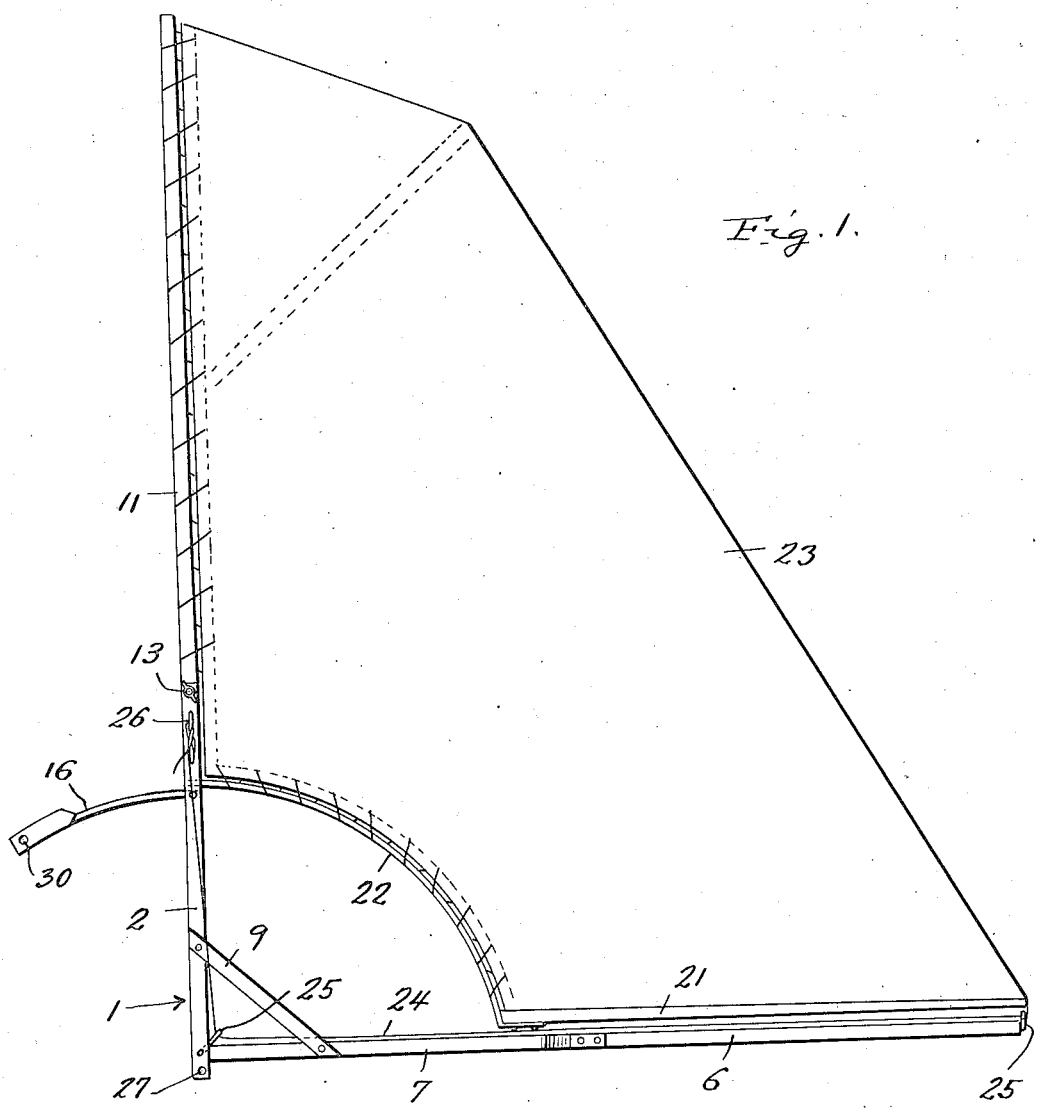

2,038,166

UNITED STATES PATENT OFFICE 2,038,166

SAIL ATTACHMENT FOR BICYCLES

Leon Andrew Deal, Beloit, Wis.

Application June 13, 1935, Serial No. 26,487

3 Claims. (Cl. 208—23)

The present invention relates to new and useful improvements in sail attachments for bicycles and has for one of its important objects to provide, in a manner as hereinafter set forth, a device of this character which may be expeditiously mounted on a conventional bicycle without the necessity of altering said bicycle structurally in any way.

Another very important object of the invention is to provide a sail attachment of the aforementioned character which, when not in use, may be folded in a manner to require a minimum of space.

Other objects of the invention are to provide a sail attachment for bicycles which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of the invention, showing the same removed from the bicycle.

Figure 2 is a view in side elevation of the rear portion of a bicycle, showing the brackets through the medium of which the invention is attached to said bicycle.

Figure 3 is a detail view in perspective of one of the attaching brackets.

Figure 4 is a perspective view of the supporting structure.

Figure 5 is a detail view in perspective of the boom.

Figure 6 is a view in horizontal section, taken substantially on the line 6—6 of Figure 2.

Figure 7 is a vertical sectional view, taken substantially on the line 7—7 of Figure 4.

Referring now to the drawings in detail, it will be seen that the embodiment of the invention which has been illustrated comprises a supporting structure which is designated generally by the reference numeral 1, said supporting structure including a pair of converging uprights 2 which are secured, at their lower ends, through the medium of brackets 3 on the end portions of the rear axle 4 of the bicycle, said bicycle being designated generally by the reference numeral 5. The uprights 2 are provided with openings 27 in their lower end portions for the reception of threaded shanks 28 on the brackets 3. Of course, nuts (not shown) are to secure the uprights 2 on the shanks 28. The supporting structure 1 further includes a rearwardly projecting arm 6, said arm 6 comprising spaced legs 7 which straddle the rear wheel 8 of the bicycle 5 and which are connected to the lower portions of the uprights 2. Braces 9 extend between the legs 7 and the uprights 2. The legs 7 are further provided with a connecting brace 10.

The upper end portions of the uprights 2 are spaced from each other for the reception therebetween of a mast 11. The mast 11 is mounted for swinging movement in a vertical plane on a rod 12 which extends between the uprights 2. A removable bolt 13 releasably secures the mast 11 in raised or operative position.

Also extending between the uprights 2, below the mast 11, is a bar 14. A brace 16 is secured, at one end, beneath the bar 14 by a bolt 15 and at its other end to a threaded shank 29 on a bracket 17, said bracket 17 being secured on the usual bolt 31 (see Figure 7) which clamps the post 19 of the seat 20 in adjusted position in the frame 18.

The reference numeral 21 designates a boom which is mounted for swinging movement on the supporting structure 1 adjacent the rearwardly extending arm 6, said boom including an arcuate forward portion 22 which accommodates the rear bicycle wheel 8 and which is journaled on the bolt 15 (see Figure 7). The mast 11 and the boom 21 carry the sail 23. A control rope or the like 24 is connected to the free end of the boom 21, said rope being slidable in guides 25 on the supporting structure 1 and being adapted to be anchored to one of the uprights 2 of said supporting structure, as at 26.

It is believed that the operation of the invention will be readily apparent from a consideration of the foregoing. The wind, of course, impinges the sail 23 for propelling the bicycle 5. The swinging boom 21 permits sufficient play of the sail for maximum efficiency, the degree of movement of said boom being controlled as desired through the medium of the rope 24. To detach the device from the bicycle, it is only necessary to remove the supporting structure 1 from the brackets 3 and 17, or if desired, said brackets may be expeditiously removed by simply removing the usual axle securing and seat post clamping nuts 32 and 33, respectively. It may be well to here state that the bracket 17 is similar in construction to the brackets 3. The brace 16 is provided with an opening 30 which receives the shank 29. When the device is not in use the mast 11 may be swung downwardly to a point adjacent the boom 21 by simply removing the bolt 13.

It is believed that the many advantages of a sail attachment for bicycles in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

1. A sail attachment for bicycles comprising a supporting structure mounted on the bicycle, said supporting structure including a pair of spaced uprights, a mast mounted for swinging movement in a vertical plane between the uprights, means for releasably securing the mast in vertical position, a boom mounted for swinging movement in a horizontal plane on the uprights, and a sail mounted on the mast and the boom.

2. A sail attachment for bicycles comprising a supporting structure mounted on the bicycle, said supporting structure including a pair of spaced, upwardly converging uprights, said supporting structure further including a rearwardly projecting arm comprising spaced legs connected to the lower portions of the uprights, a mast mounted for swinging movement in a vertical plane between the upper portions of the uprights, means for releasably securing the mast in operative position, a boom mounted between the uprights for swinging movement in a horizontal plane, a sail mounted on the mast and the boom, and a flexible element slidably mounted on the arm and connected to the free end of the boom for limiting the swinging movement of said boom.

3. A sail attachment for bicycles of the type including a frame, a rear axle, and a rear wheel journaled on said axle, comprising a supporting structure, said supporting structure including a pair of spaced, upwardly converging uprights secured, at their lower ends, to the end portions of the axle, means connecting the upper portions of the uprights to the frame, said uprights extending on opposite sides of the wheel, a mast mounted for swinging movement in a vertical plane between the upper end portions of the uprights, means for releasably securing said mast in operative position, a boom mounted for swinging movement in a horizontal plane between the uprights, a sail mounted on the mast and boom, and means for controlling the swinging movement of said boom.

LEON ANDREW DEAL.